(12) United States Patent
Cardon

(10) Patent No.: US 9,098,863 B2
(45) Date of Patent: Aug. 4, 2015

(54) COMPRESSED ANALYTICS DATA FOR MULTIPLE RECURRING TIME PERIODS

(71) Applicant: David L. Cardon, Provo, UT (US)

(72) Inventor: David L. Cardon, Provo, UT (US)

(73) Assignee: Adobe Systems Incorporated, San Jose, CA (US)

( * ) Notice: Subject to any disclaimer, the term of this patent is extended or adjusted under 35 U.S.C. 154(b) by 265 days.

(21) Appl. No.: 13/629,047

(22) Filed: Sep. 27, 2012

(65) Prior Publication Data

US 2014/0089525 A1    Mar. 27, 2014

(51) Int. Cl.
*G06Q 30/02* (2012.01)

(52) U.S. Cl.
CPC .................................. *G06Q 30/0204* (2013.01)

(58) Field of Classification Search
CPC ........................... G06Q 30/02; G06F 17/30489
USPC ......................................................... 709/247
See application file for complete search history.

(56) References Cited

U.S. PATENT DOCUMENTS

| | | | |
|---|---|---|---|
| 5,394,143 A * | 2/1995 | Murray et al. | 341/63 |
| 7,496,598 B2 * | 2/2009 | Westendorf et al. | 1/1 |
| 7,822,755 B2 | 10/2010 | Barua et al. | |
| 8,103,880 B2 | 1/2012 | Bailey et al. | |
| 8,131,703 B2 | 3/2012 | Bessieres et al. | |
| 8,762,638 B2 * | 6/2014 | Hara et al. | 711/114 |
| 2002/0186237 A1 | 12/2002 | Bradley et al. | |
| 2004/0107181 A1 * | 6/2004 | Rodden | 707/1 |
| 2005/0219076 A1 * | 10/2005 | Harris | 341/51 |
| 2006/0277197 A1 | 12/2006 | Bailey | |
| 2010/0312884 A1 | 12/2010 | Nandy et al. | |
| 2011/0119226 A1 | 5/2011 | Ruhl et al. | |
| 2011/0225288 A1 * | 9/2011 | Easterday et al. | 709/224 |
| 2012/0030276 A1 | 2/2012 | Narayanan et al. | |

OTHER PUBLICATIONS

Archana Ganapathi and Steve Zhang, "Web Analytics and the Art of Data Summarization," SLAML '11, Oct. 23, 2011, Cascais, Portugal, Copyright © 2011 ACM, pp. 1-9.

* cited by examiner

*Primary Examiner* — Kevin Bates
*Assistant Examiner* — Chen-Liang Huang
(74) *Attorney, Agent, or Firm* — Kilpatrick Townsend & Stockton LLP

(57) ABSTRACT

Analytics data for a network-based site may be compressed according to recurring time periods. An analytics service may obtain analytics data for network-based sites to compress into a compressed analytics data stream. To compress the analytics data, the analytic service may identify a particular time period corresponding to each analytic data value and may add the analytic data value to the compressed analytics data stream as either a baseline object for the particular time period or a difference object relative to an existing baseline object for the particular time period. These objects may be interleaved according to a time-based ordering of multiple different recurring time periods. An analytic service may send the compressed analytics data stream to an analytics client. The analytics client may decompress a portion of the compressed analytics trend without decompressing the remaining portions of the compressed analytics data stream.

20 Claims, 9 Drawing Sheets

|  | Value | Type | Period |
|---|---|---|---|
| 802 | 240 | Baseline | 1 |
| 804 | 225 | Baseline | 3 |
| 806 | -100 | Baseline | 2 |
| 808 | 240 + *(-20)* = 220 | Delta | 1 |
| 810 | 225 + 35 = 260 | Delta | 3 |
| 812 | -100 + 225 = 125 | Delta | 2 |
| 814 | 220 + *(-120)* = 100 | Delta | 1 |

*FIG. 8*

COMPRESSED ANALYTICS DATA FOR MULTIPLE RECURRING TIME PERIODS

BACKGROUND

For purveyors of goods and information, a network-based site, such as a website on the Internet, offers site operators the ability to reach a vast potential audience. In order to understand the various ways and reasons users interact with these network-based sites, site analytics data representing these interactions may be recorded. In some instances, large amounts of site analytics data may be gathered in response to a correspondingly large number of users. Transmitting and processing large amounts of site analytics data can strain data storage and communication resources for entities that wish to obtain insight based on user interactions. Moreover, the dynamic environment in which network-based sites operate places a high value on maintaining current or real-time data availability.

SUMMARY

Various embodiments of compressing analytics data according to recurring time periods for a network-based site are described. An analytics service may obtain analytics data that includes a plurality of analytics data values for one or more network-based sites. Before storing and/or transmitting the analytics data, an analytic service may compress the analytics data into a compressed analytics data stream. In order to compress the analytics data, the analytic service may identify a particular time period corresponding to each analytic data value. A particular time period may be one of a multiple of different recurring time periods for the analytics data. An analytic service may add the analytic data value to a compressed analytics data stream as either a baseline object for the particular time period or a difference object relative to an existing baseline object for the particular time period. The compressed analytics data stream may include multiple baseline objects and multiple difference objects interleaved according to a time-based ordering of the different recurring time periods.

BRIEF DESCRIPTION OF THE DRAWINGS

FIG. 8 illustrates an example of decompressed analytics data values from a compressed analytics data stream, according to some embodiments.

DETAILED DESCRIPTION OF EMBODIMENTS

Figure 1:
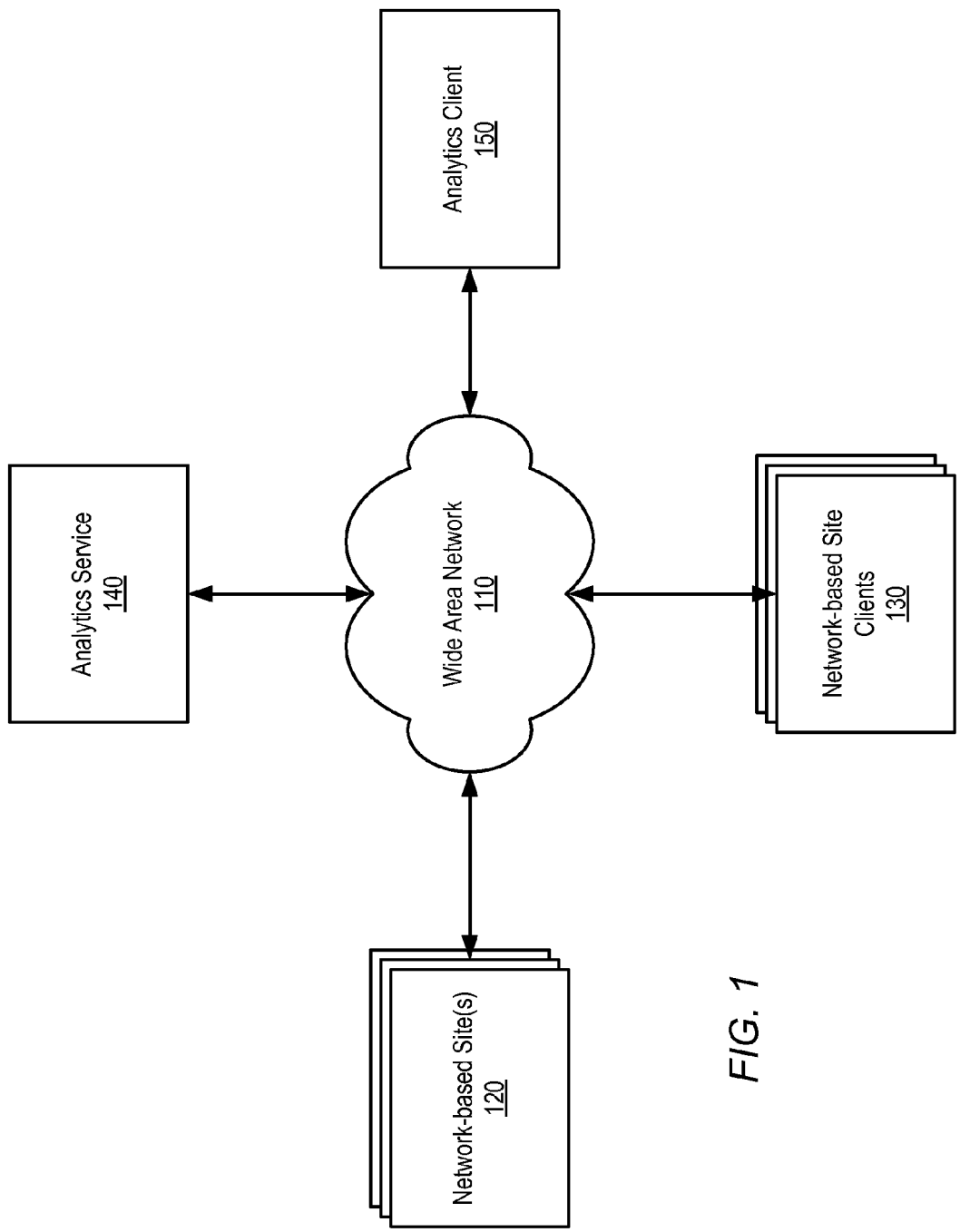
FIG. 1 illustrates an analytics service operating environment, according to some embodiments.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that are not be described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of compressing analytics data according to recurring time periods for a network-based site are described herein. An analytics service collects analytics data, such as web analytics data, for one or more network-based sites, such as a website. This analytics data may generally be provided to an operator of the network based site using a client application, such as an application implemented in a client's web browser. Before sending the analytics data to a client application, the analytics service may compress the data according the time periods associated with each data value, such as days of the week. As these time periods repeat in a sequence, analytic data values for multiple different time periods may be stored and compressed in a data stream according to the sequence of time periods. These analytic data values may be added to the data stream as a baseline value or a value relative to the baseline value, such as the difference between the values.

Network-based sites, such as websites connected via the Internet, may offer various goods, services, and information to clients, customers, viewers, or users generally of client systems that interact with network-based sites. For example, a customer may order goods from an online merchant, or rent or temporarily gain access to media for viewing. Entities that own, operate, and/or control network-based sites may wish to gain insight into these interactions. Insight may be gleaned from analyzing various sets of analytics data associated with particular network-based sites. For example, an online merchant may wish to know the number of viewers of the merchant's home page on a given day of the week, or a particular month of the year. By comparing these data values to other data values for other days of the week or months of the year, the online merchant may better understand viewer trends and adjust their site accordingly. Entities may obtain analytics data for analysis, such as to observe viewer trends, from an analytics data service.

An analytic service may, in various embodiments, obtain analytics data for one or more network-based sites from many different sources, including the network-based site or sites, other third-party services, or from the client devices interacting with the network-based sites. Further discussion of the available methods and technologies to record, aggregate, and obtain analytics data, as well as the various types of analytics data, is given below with regard to FIG. 1. Once obtained, an analytic service may compress the analytics data into a compressed analytics data stream prior to storing or sending the analytics data to one or more other systems or devices. However, in some other embodiments, the analytics data may be stored in uncompressed form prior to sending the analytics data as a compressed analytics data stream.

To compress analytics data, an analytics service may identify a particular time period corresponding to each analytic data value. A particular time period may be one of multiple different recurring time periods for the analytics data. For example, the multiple different time periods may be days of the week (Sunday, Monday, Tuesday, Wednesday, etc.) which upon reaching the final time (Saturday) repeat again (Sunday, Monday, etc.). An analytic data value corresponding to a time period may, for example, be the number of unique visitors to a network-based site on a particular day of the week.

Once a particular time period is identified, an analytics service may add the analytic data value to the compressed analytics data stream. The analytic data value may be added as either a baseline object for the particular time period identified as corresponding to the analytic data value or a difference object relative to an existing baseline object for the particular time period. A baseline object may include a new baseline marker element indicating the start of a new baseline object in the compressed analytic data stream, a new baseline definition element which defines an allocated storage size for storing difference for the particular time period and a base value element storage size, and a baseline value element storing the analytic data value, sized according to the baseline value element storage size. A difference object may include a difference value (such as a delta value) relative to an existing baseline object for the particular time period. Identifying a particular time period corresponding to the analytic data and adding the analytic data value to the compressed analytics data stream may be repeated for each analytic data value in the analytics data.

In some embodiments, an analytics service may determine whether to add the analytic data value as a baseline object to the compressed analytics data stream. To make this determination, the storage size for the difference object of the analytic data value under consideration may be determined and then compared to an allocated storage size for storing difference objects for the particular time period, such as one defined in an existing baseline object that includes a baseline definition element. If the storage size of the difference object exceeds the allocated storage size, then the analytic data value may be added as a new baseline object for the particular time period. In some embodiments, if the analytic data value is not added as a baseline object, then the analytic data value is added as a difference object.

In various embodiments, the compressed analytics data stream includes multiple baseline objects and multiple difference objects, interleaved according to a time-based ordering of the plurality of different recurring time periods identified as for the analytic data values. If, for example, there are three different recurring time periods, then the baseline objects and difference objects corresponding to the time periods are interleaved in the time-based order, object for 1, object for 2, object for 3, then object for 1, object for 2, object for 3, and so on until all of the analytic data values are added to the compressed analytics data stream as either baseline objects or difference objects. Also included in the compressed analytics data stream may be a time period object indicating the number of distinct recurring time periods interleaved. Using the previous example, the time period object would indicate 3 distinct time periods.

The compressed analytics data stream may be sent to a remote client device, such as an analytics client, in response to receiving a request for analytics data from the remote client device. The compressed analytics data stream may be sent without decompressing the compressed analytics data stream before sending. In at least some embodiments, the compressed analytics data stream may also be searched by the analytics service to detect a sequence of repeating difference objects associated with a baseline object and modify the compressed analytic data stream to apply runtime length compression to the repeating sequence of difference objects.

A client device, such as an analytics client, may obtain a compressed analytic data stream from an analytic service or other remote entity. Likewise, the client device may obtain the compressed analytic data stream from local storage at the client device, having previously received the compressed analytic data stream. To decompress at least a portion of the compressed analytics data stream, an analytics client may identify a baseline object and the difference objects associated with the baseline object. An analytics client may identify baseline objects by searching the compressed analytic data stream for new baseline marker elements included within the baseline objects. To identify difference objects associated with the identified baseline object, an analytics client may select difference objects from difference objects determined to correspond to the same time period as the baseline object that occur between the new baseline marker element of the identified baseline object and another new baseline marker element of another baseline object that corresponds to the same time period. For each of the associated difference objects, an analytic data value may be determined by the analytics client relative to a baseline value element included in the baseline object. Other baseline objects may be identified as well as their associated difference objects in order to determine an analytics data value for each difference object and decompress other portions of the compressed analytics data stream. In some embodiments, an analytics client may generate one or more views of the decompressed portion of the compressed analytics data stream for display without decompressing the remaining portion of the compressed analytic data stream.

Embodiments of compressing analytics data according to recurring time periods for a network-based site may be implemented in any system or application that provides analytics data for a network-based site to client devices for further processing. An example category of application in which embodiments may be implemented is network-based site analytics software, such as software as a service (SaaS) network-based site analytics tools, or network-based site analytics tools locally implemented, or more generally in applications in which compressed analytics data may be distributed over wired or wireless networks. Embodiments of compressing analytics data according to recurring time periods for a network-based site may, for example, be implemented as a module of a larger network-based site analytics application. Specific examples of applications or technologies in which embodiments may be implemented include, but are not limited to, Adobe® SiteCatalyst® technology. "Adobe", and "SiteCatalyst" are either registered trademarks or trademarks of Adobe Systems Incorporated in the United States and/or other countries.

Figure 9:
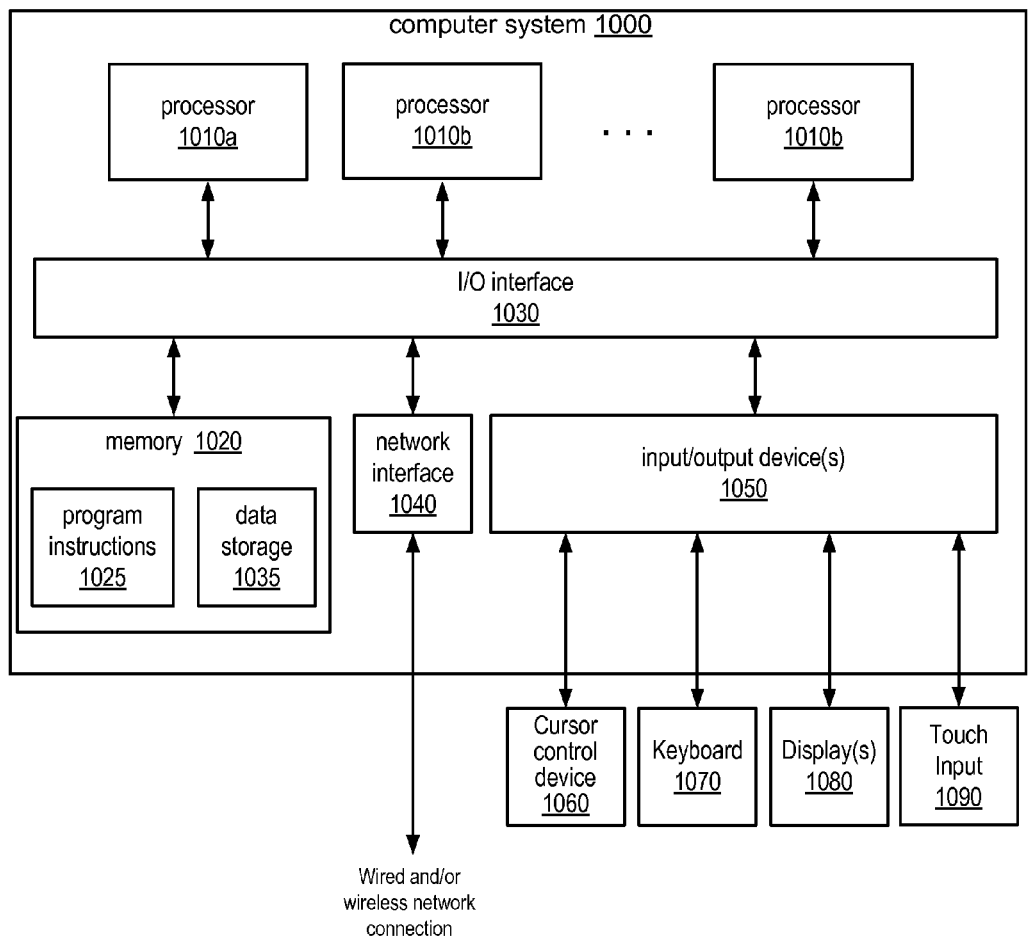
FIG. 9 illustrates an example computer system, according to some embodiments.

Embodiments of compressing analytics data according to recurring time periods for a network-based site may be implemented and performed by a module or modules implemented by program instructions stored in a computer-readable storage medium and executable by one or more processors (e.g., one or more CPUs and/or GPUs). An example computer system on which embodiments may be implemented is illustrated in FIG. 9.

Analytics Service Operating Environment

Various embodiments of compressing analytics data according to recurring time periods for a network-based site may be implemented in a analytics service operating environment, such as illustrated in FIG. 1. An analysis service 140 may obtain various analytics data, sometimes known as web analytics data, for one or more network-based sites 120. The analytics data may describe various interactions of network-based site clients 130 with the one or more network-based sites 120. Network-based site analytics data may be processed or compressed by the analytics service 140 and sent to an analytics client 150 for decompression, processing, and display.

Network-based site clients 130 may be a desktop computer, laptop computer, tablet computer, mobile phone, personal digital assistant (PDA), or any other electronic or computing device, such as described below with regard to FIG. 9, configured to interact with one or more network-based sites 120 over a wide area network 110. For example, a user may operate a mobile phone to open a mobile internet browser that connects to and interacts with a website over a wireless network connection to the Internet. Likewise other computing devices may implement other hardware or software configurations, standardized to communication protocols such as a Hypertext Transfer Protocol (HTTP) enabled browser application, or some other customized communication protocol and application to interact with a network-based site.

A network-based site 120 may be a system configured to provide information and services to one or more network-based site clients 130 over a wide area network 110. Common examples of a network-based site may be servers implementing a webpage, such as a webpage storefront of an online merchant, available over the Internet, to one or more clients systems implementing Internet browsers. A network-based site 120 may be implemented on one or more servers or nodes of distributed system, and/or a computer system, such as computer system 1000 described below with regard to FIG. 9. Multiple network-based sites 120 may be networked together to form larger network-based sites. As many possible configurations and implementations of network-based sites are well-known to those of ordinary skill in the art, the previously listed examples are not intended to be limiting. Various entities may own, operate, or control network-based sites 120. For example, a merchant may place items on an auction-based ecommerce site. A separate company may control the auction-based ecommerce site, not the merchant. Conversely, a news media company may both own the content posted on a news media site and also own/operate the news media site.

Analytics data may be collected for one or more network-based sites 120 or groupings of multiple network-based sites. The granularity or specificity of analytics data may be narrowed to record interactions for a single portion of a single location within a network-based site or broadened to include many different interactions on many different locations of a grouping of multiple network-based sites.

Many well-known methods and technologies exist to record, capture, and otherwise collect analytics data for one or more network-based sites 120. One common method is to obtain analytics data from logfiles, records of interactions, stored on the systems implementing the one or more network-based sites 120. For example, servers implementing webpages commonly maintain a history of page requests. Other information about these requests may include, but is not limited to, the client system IP address, request date and time, the particular page of the site requested, http code, bytes served, user agent, and referrer. This information may be stored in a standardized format, such as the Extended Log File Format promulgated by the W3C®. "W3C" is a registered trademark of the Massachusetts Institute of Technology (MIT), European Research Consortium for Informatics and Mathematics (ERCIM), or Keio University (Keio) in the United States and/or other countries. Other proprietary or customized formats may be implemented to determine analytics data recorded in a logfile. Analytics data may be recorded in multiple files for a single network-based site or in a single file.

Another common method for collecting analytics data is page tagging (sometimes known as "web bugs"). Page tagging may be implemented by an analytics service, network-based site owner/operator, or other third party service. A small invisible image or server call may be implemented on a particular network-based site (or portion of a network-based site) that sends a request or call to a collection server that includes information about the client interacting with the tagged network-based site. Cookies, portions of data stored at a client device, may be relied upon to provide further information about a particular client device in a call or request to the collection server. Other methods analytics data collection exist, and thus, the above examples are not intended to be limiting.

Various types or categories of analytics data are well-known to those of ordinary skill in the art. Some of these types or categories may include, but are not limited to, hit, page view, session, first visit, unique visitor, repeat visitor, impression, bounce rate, exit rate session duration, active time, frequency, click path, and single click instance. Many different combinations and configurations of analytics data exist. One or more of these types or categories may correspond to one time period of multiple different recurring time periods. For example, the number of single click instances that occur on a "Get Daily Coupon" component for a network-based sited may correspond to days of the week, or specific hours of the day.

In some embodiments, an analytics service 140, described below in further detail with regard to FIG. 2, may be implemented on one system or server, such as computer system 1000 described below in FIG. 9, or on a plurality of systems or servers, such as one or more nodes of a distributed system. Analytics service 140 may employ a variety of methods to gather or obtain analytics data for one or more network-based sites 120, such as the methods and technologies, as well as the types and categories of analytics data, discussed above. In some embodiments, an analytics service 140 may operate one or more collection servers, such as discussed above, to receive information pertaining to interactions between network-based site client devices 130 and the one or more network-based sites 120. Alternatively, an analytics service may obtain analytics data from the network-based site 120 or other third party implementing a collection server that receives information pertaining to interactions between network-based sited client devices 130 and the one or more network-based sites 120. For example, analytics service 140 may obtain one or more logfiles, or other network-based site collected data from the one or more network-based sites 120. An analytics service 140 may compress obtained analytics data into a compressed analytics data stream and store the compressed analytics data stream in a storage location accessible to the analytics service. The compressed analytics data stream may be sent to analytics client 150 over wide area network 110. In some embodiments, the compressed analytics data stream may be sent to an analytics client 150 in response to a request.

Figure 3:
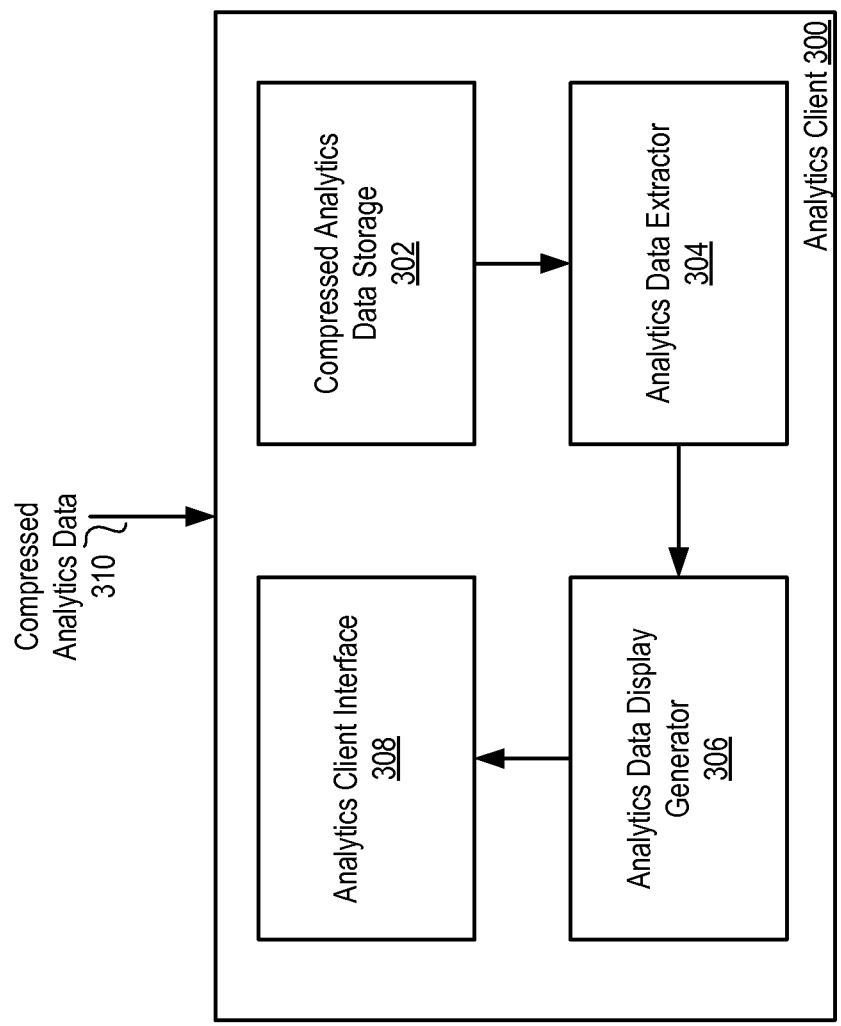
FIG. 3 illustrates an example analytics client, according to some embodiments.

Analytics client 150, described below in further detail with regard to FIG. 3, may be implemented on a desktop computer, laptop computer, tablet computer, mobile phone, personal digital assistant (PDA), or any other electronic or computing device, such as computer system 1000 described below with regard to FIG. 9, configured to obtain a compressed analytics data stream. Generally an analytics client may be operated by an entity that owns, operates, or controls the network-based site for which the analytics data is obtained. Analytics client 150 may obtain, in various embodiments, a compressed analytics data stream from analytics service 140 via wide area network 110. Analytics client 150 may decompress at least a portion of the compressed analytic data stream and generate one or more views of the decompressed portion of the compressed analytic data stream.

Analytics Service

An analytics service may be implemented on one system or server, such as computer system 1000 described below in FIG. 9, or on a plurality of systems or servers, such as one or more nodes of a distributed system. Various embodiments may implement an analytics service in a variety of different software and hardware configurations. FIG. 2 illustrates one such example of an analytics service configured to implement methods of compressing analytics data according to recurring time periods for a network-based site, according to some embodiments.

In some embodiments, an analytics service 210, may obtain analytics data 202 for one or more network-based sites. Analytics data of various categories and types may be obtained by an analytics service 210 according to a variety of methods and technologies, as discussed above with regard to FIG. 1. For example, analytics service 210 may receive analytics data 202 from a collection server (not pictured) that collected analytics data for one or more network-based sites through methods such as page tagging or other third party collection techniques. In another example, analytics service 210 may obtain analytics data 202 from one or more network-based sites that collected analytics data through logfiles or other locally stored records of interactions between the one or more network-based sites and network-based site clients. As to the type or categories of analytics data, an analytics service 210 may, for instance, receive the number of page views for a particular page of a network-based site or the number of referrals to a network-based site from a particular keyword in a particular month. Analytics service 210 may be configured to obtain analytics data through any number of customized or standardized protocols or communication schemes over a wide area network. For example, analytics service 210 may receive logfiles or other recorded analytics data from one or more network-based sites through a publicly standardized protocol, such as File Transfer Protocol (FTP). Alternatively, analytics service 210 may provide a customized communication scheme, such as by implementing customized message formats and/or application programmer interface (API) components, between the analytics server 210 and network-based sites or other systems that provide analytics data (or analytics client 218).

Analytics service 210 may implement analytics data compressor 214 to compress obtained analytics data into a compressed analytics data stream according to the various methods for compressing analytics data according to recurring time periods for a network-based site, as discussed in greater detail below with regard to FIGS. 4 through 6. A variety of hardware and software components may be configured to implement analytics data compressor 214 capable of performing these various methods. In some embodiments, analytics service 210 may receive multiple sets of analytics data for multiple network-based sites. Analytics data compressor 214 may be configured to combine one or more of these multiple sets of analytics data into one or more compressed analytics data streams. For example, a single entity owns/operates website A and website B. Analytics data compressor 214 may compress the analytics data of total page views for both websites together into one compressed analytics data stream. Analytics data compressor 214 may be configured to compress additional analytics data, adding the additional analytic data values to a previously compressed analytics data stream. For example, analytics service 210 receives a daily page view total for a network-based site. When the daily page view total is received, the analytics data compressor 214 adds the analytics data as either a baseline object or a difference object to a compressed analytics data stream stored in analytics data storage 212. Analytics data compressor 214 may also be configured to provide additional compression techniques, such as applying runtime length compression to sequences of repeating difference objects associated with the same baseline object.

After compressing analytics data into a compressed analytics data stream, some embodiments may store the compressed analytics data stream in analytics data storage 212. Analytics data storage may be one or more databases or database servers local to analytics service 210 or external to analytics service 210. Conversely, in at least some embodiments analytics data 202 is stored in analytics data storage 212 in uncompressed form (not depicted) until analytics data compressor 214 compresses the analytics data into a compressed analytics data stream.

Analytics service interface 216 may obtain a compressed analytics data stream from either analytics data storage 212 or directly from analytics data compressor 214. Analytics service interface 216 may also be configured to receive and respond to various requests from one or more analytics client devices 218. In some embodiments, analytics service interface may be presented to analytics client 218 as a user interface, such as a web page or web application. Analytics service interface 216 may also be configured to send a compressed analytics data stream to analytics client 218. In some embodiments, this compressed analytics data stream may be sent in response to a request for analytics data from analytics client

218. In some embodiments, a compressed analytics data stream may be pushed, or sent without request, in response to a particular condition or indication, such as when the analytics data has been compressed by analytics data compressor 214, to analytics client 218.

Figure 2:
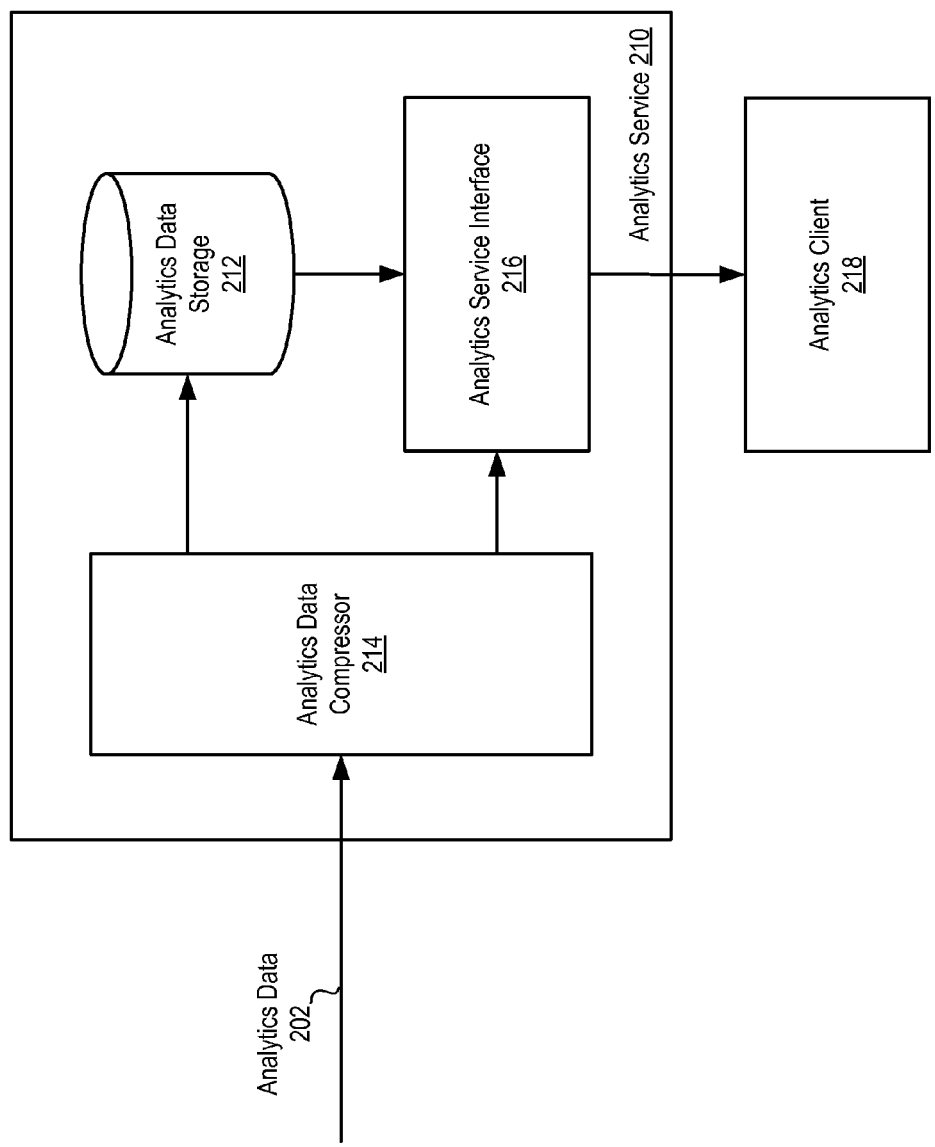
FIG. 2 illustrates an example analytics service, according to some embodiments.

As numerous other configurations of hardware and software components may be configured to implement an analytics service, FIG. 2 is not intended to be limiting.

Analytics Client

An analytics client may be implemented on a desktop computer, laptop computer, tablet computer, mobile phone, personal digital assistant (PDA), or any other electronic or computing device, such as computer system 1000 described below with regard to FIG. 9, configured to obtain a compressed analytics data stream, decompress at least a portion of the compressed analytics data stream, and generate one or more views of the decompressed portion of the compressed analytics data stream. An analytics client may be implemented through various configurations of hardware or software devices. For example, an analytics client may be implemented as a standalone software application stored locally on desktop computer. Alternatively, in some embodiments an analytics client may be implemented as a client-side web application, such as through a web browser running a JavaScript® or ActionScript® implementation of an analytics client. "JavaScript" is a registered trademark of Oracle Corporation in the United States and/or other countries. "ActionScript" is a registered trademark of Adobe Systems Incorporated in the United States and/or other countries. FIG. 3 illustrates an example analytics client, according to some embodiments.

Analytics client 300 may obtain a compressed analytics data stream 310. In some embodiments this compressed analytics data stream 310 may be obtained from an analytics service, such as analytics service 210 described above with regard to FIG. 2. Analytics client 300 may be configured to request compressed analytics data 310 via the analytics client interface 308 from an analytics service. In some embodiments, compressed analytics data 310, such as a compressed analytics data stream, may be obtained automatically, without a request to an analytics service. Analytics client 300 may be configured to obtain compressed analytics data over wired or wireless networks, such as discussed above with regard to wide area network 110 in FIG. 1.

In some embodiments, obtained compressed analytics data 310, such as a compressed analytics data stream, may be stored in compressed form in compressed analytics data storage 302. Compressed analytics data storage 302 may configured to store compressed analytics data 310 locally, such as one or more compressed analytics data streams, for further processing by analytics client 300. Compressed analytics data storage 302 may store compressed analytics data 310 for multiple network-based sites.

Figure 7:
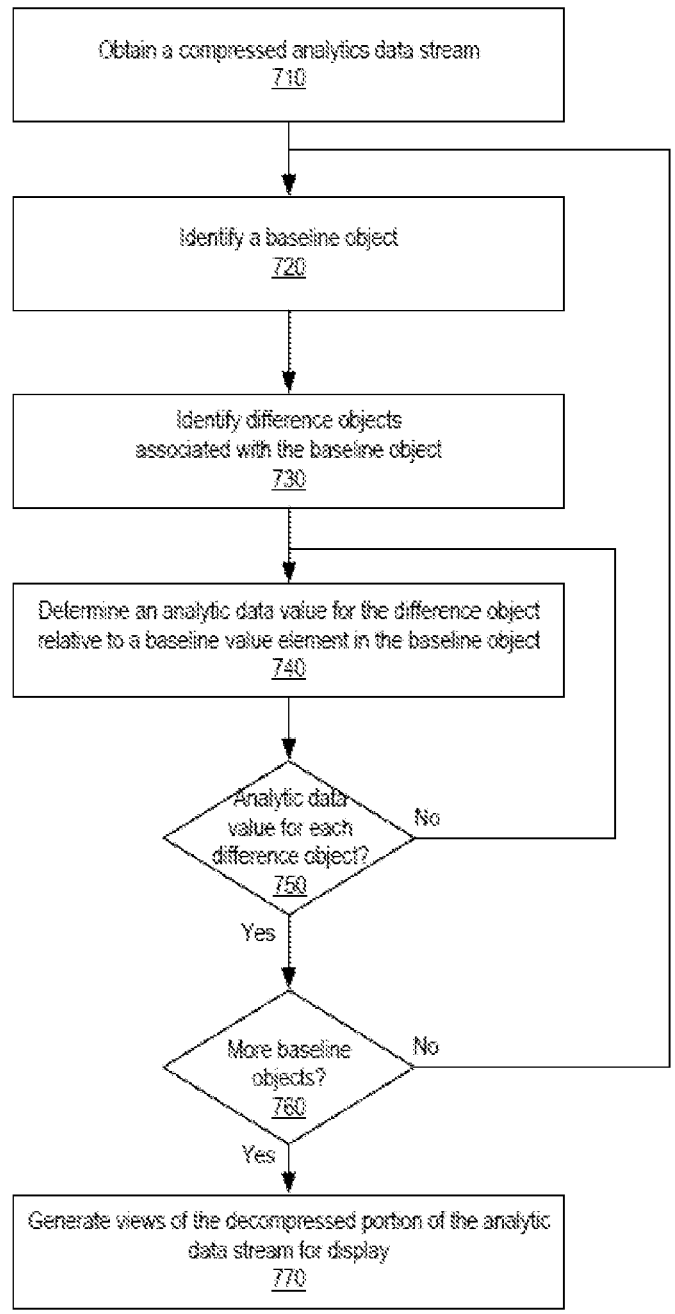
FIG. 7 illustrates a workflow of a method to decompress a compressed analytics data stream, according to some embodiments.

In some embodiments, analytics data extractor 304 may be configured to implement various methods for decompressing compressed analytics data, such as the methods describe below with regard to FIGS. 7 and 8. Analytics data extractor 304 may decompress a portion of a compressed analytics data stream, leaving the remaining portions compressed. Analytics data from decompressed portions of a compression analytics data stream may be provided to analytics data display generator 306. Analytics data display generator may be configured to generate one or more views of analytics data for one or more network-based sites. Views of analytics data may include various graphical or numeric representations, including, but not limited to, trend graphs, charts, or tables. Analytics data display generator 306 may be implemented using a variety of hardware components, such as graphics and rendering components discussed below with regard to FIG. 9, as well as various software components. For example, analytics data display generator 306 may be configured to receive input from a user of analytics client 300 requesting a specific graph for a specific analytic data type for a particular network-based site. Software components may be implemented within the analytics data display generator 306 to generate a view of the analytics data according to the given inputs. In some embodiments, analytics client interface 308 may receive inputs from a user, such as a request for a specific view of analytics data (not depicted). Analytics client interface 308 may also be configured to received generated views and display them for a user.

Workflow of Analytics Data Compression According to Recurring Time Periods

As discussed above with regard to FIGS. 1 and 2, an analytics service may obtain analytics data for a network-based site in order to compress the analytics data into a compressed analytics data stream. An analytics service may implement an analytics data compressor, such as analytics data compressor 214 discussed above with regard to FIG. 2, or other component or combination of components configured to compress obtained analytics data into a compressed analytics data stream. FIG. 4 illustrates a workflow of a method to compress analytics data into a compressed analytics data stream, according to some embodiments.

An analytics service may obtain analytics data for one or more network-based sites that includes multiple analytic data values 410. Analytics data may be one or more types or categories of analytics data, such as hit, page view, session, first visit, unique visitor, repeat visitor, impression, bounce rate, exit rate session duration, active time, frequency, click path, and single click instance. Numerous other types and categories of analytics data may be obtained, such as those discussed above with regard to FIG. 1. A variety of methods and technologies are available to collect analytics data, such as logfiles and page tagging, also discussed above with regard to FIG. 1. In some embodiments, multiple different recurring time periods may correspond to the analytics data. For example, analytics data, such as unique visitors, may correspond to days of the week, months of the year, hours of the day, or any other different recurring time periods.

In various embodiments, an analytics service may identify a particular time period corresponding to an analytic data value 420. To make this identification, an analytics service may examine the analytics data itself. For example, analytics data may be obtained in various forms. Different well-known data structures, such as tables, lists, or arrays, may contain multiple information fields associated with each analytic data value, that contain information indicating a particular time period in addition to the analytic data type and value. For example, an analytics service may obtain a multi-dimensional array of bounce rate values for a particular page of a network-based site. Each entry in the array contains an entry that indicates the analytic data type is bounce rate, the bounce rate value, and the day corresponding to the bounce rate. Other customized data structures, such as class definitions or other objects defined in an API may also be used. An analytics service may also be able to obtain information, such as time period or analytics data type based on the time the analytic data value was received, or the source of the analytics data value. For example, an analytics service may be configured to receive unique visitors analytics data from a specific collection server. By identifying the particular collection server, the analytics service may identify the particular type of analytics data received. Likewise, in another example, an analytics service may be configured to receive analytics data for a specific time period, for example, a day of the week, at a certain time on the day following the time period. The analytics service may recognize that the analytics data received on one day corresponds to the analytics data value for the previous day. Various other methods and data structures may be implemented that identify a particular time period corresponding to the analytic data value.

An analytic service may add the analytic data value to a compressed analytics data stream as either a baseline object for the particular time period identified at 420, or difference object relative to an existing baseline object for the particular time period identified at 420. A baseline object may include a new baseline marker element that indicates the start of a new baseline object in the compressed analytic data stream. For example, a new baseline marker element may be a particular data value, number, or bit pattern. In some embodiments, a new baseline marker element is a value stored in a single byte. A new baseline marker may also indicate a specific form of compression applied to the baseline object and different objects associated with the baseline object. For example, a new baseline marker value may indicate that the baseline object indicates the baseline value for a set of runtime length compression values.

A baseline object may also include a new baseline definition element that includes a new allocated storage size for storing difference objects for the particular time period and a baseline value element storage size. Both the new allocated storage size and the baseline value element storage size may indicate the number of storage units that a difference object or a baseline value element may occupy in the compressed analytics data stream. To determine what value to set as the new allocated storage size, in some embodiments an analytics service may analyze previously stored difference objects for the particular time period or multiple time periods using various statistical methods to determine a value that provides for a particular storage goal. One example of the storage goal may be to provide a storage value that would store the average difference value of the difference objects. In another example, the storage goal may be to prevent an analytics service from having to add new baseline objects to the compressed analytics data stream, and, therefore, analyzing the previously stored difference objects to determine a storage size value that will hold the largest previously stored difference object. Other methods and techniques may be applied to determine the new allocated storage size, such as incrementing up the new allocated storage size from the previous allocated storage size. Similarly, the same techniques and examples listed above may be applied to the baseline value element storage size. As many possible methods of determine a storage size for a value may be envision, neither of the previous examples is intended to be limiting.

An example of a new baseline definition element, in some embodiments, may be a new allocated storage size that indicates two bytes and a baseline value element storage size that indicates one byte. Thus, according to this example, a difference object corresponding to the same time period corresponding to the baseline object may be stored in two bytes in the compressed analytics data stream and the baseline value element stored in the baseline object may be stored in one byte in the compressed analytics data stream.

A baseline object may also include a baseline value element storing the analytic data value. The baseline value element may be sized according to the baseline value element storage size, such as in the previous example.

A difference object may include the difference value representing the analytic data value relative to an existing baseline object for the particular time period. For example, the difference value of −20 corresponding to a Monday time period may indicate that the analytic data value stored as the difference object including −20 may be 20 less from the baseline value for the Monday time period. The difference value may be determined according to a delta compression or similar compression technique. Further examples are discussed below with regard to FIG. 6.

In some embodiments, the analytic server may implement adding the analytic data value to the compressed analytics data stream by determining whether analytic data value is to be added as a new baseline object 422. FIG. 5 illustrates a workflow of a method to determine whether to add a new baseline object to a compressed analytics data stream, according to some embodiments. An analytics server may first determine a storage size for the difference object 510. In some embodiments, an analytic service may determine a difference value for the analytic data value relative to the baseline value element of the baseline object corresponding to the time period of the analytic data value, identified at 420. Such a determination may, in some embodiments be made according to delta compression or other similar techniques. Then, an analytic server may determine the number of storage units necessary to store the difference object including the determined difference value. For instance, if the baseline value element indicates a value of 10 and corresponds to Monday, and if the analytic data value is 300, then the difference value may be 290 for the difference object. If the storage units in the compressed analytics data stream are determined in signed bytes, then the determined storage size of the value of 290 may be determined as 2 bytes (as 1 byte may only store up to ±128).

The analytics server may then determine whether the storage size exceeds an allocated storage size for storing difference objects for the particular time period 520. In some embodiments, the allocated storage size for storing difference objects is indicated in the new baseline definition element of the baseline object corresponding to the same time period as the difference object. Thus, continuing the previous example, if the baseline object corresponding to Monday has a new allocated storage size of 1 and the determined storage size for the difference object is 2, then, the analytics service may add the analytic data value as a new baseline object for the particular time period 530. In some embodiments, if the determined storage size does not exceed the allocated storage size, then the analytics service may add the analytic data value as a difference object 540.

In some embodiments, the analytics service may add the analytic data value to the compressed analytics data stream as a baseline object for the time period 430. In some embodiments adding the baseline object to the compressed analytics data stream may include inserting a new baseline marker element, such as the new baseline marker element discussed above, indicating the start of a new baseline object in the compressed analytic data stream; inserting a new baseline definition element, such as the new baseline definition element discussed above, including a new allocated storage size for storing difference objects for the particular time period and a baseline value element storage size; and inserting a baseline value element, such as the baseline value element discussed above, storing the analytic data value sized according to the baseline value element storage size. In at least some embodiments, the location of the baseline object added in the compressed data stream may be determined relative to the immediately adjacent baseline object or difference object corresponding to the particular time period interleaved according to the time-based ordering of the multiple different recurring time periods. For example, if the analytics data includes three time periods and three analytic data values corresponding to each time period, then the third analytic value for the third time period may be located relative to the immediately adjacent baseline object or difference object, in this example—the object for the second analytic value for the third time period, and interleaved according to the time-based ordering of the multiple different recurring time period. Thus the third analytic data value for the third time period may be located next to the third analytic data value for the second time period, as it is interleaved with the third analytic data values for the first and second time periods. Shown visually, [(3rd value, 3rd time period), (3rd value, 2nd time period), (3rd value, 1st time period), (2nd value, 3rd time period), (2nd value, 2nd time period), (2nd value, 1st time period), (1st value, 3rd time period), 1st value, 2nd time period), (1st value, 1st time period)]. FIG. 6, discussed below, provides further illustration of the location of objects within the compressed analytics data stream, according to some embodiments.

In some embodiments, the analytics service may add the analytic data value to the compressed analytics data stream as a difference object relative to an existing baseline object for the particular time period 440. A difference object may include a difference value element that indicates the difference of the analytic data value relative to the baseline value element of the baseline object corresponding to the particular time period identified at 420, and possibly another difference object associated with the same baseline object. The difference value element may, in some embodiments, be determined according to a delta compression or other similar technique. For example, if the baseline object includes a baseline value element of 300 for time period 3, and the analytic data value of time period 3 being added has a value of 200, then the difference value of the difference object for that analytic data value may be −100. If another analytic data value of time period 3 has a value of 250, then, the difference of value of the different object may be 50 (if the analytic data value is located subsequent to the difference object of −100). As delta compression is well-known to those of ordinary skill in the art, many different implementations and techniques for determining a difference value may be implemented and, therefore, the previous examples are not intended to be limiting.

In at least some embodiments, a compressed analytics data stream may include two or more baseline objects that correspond to the same time period. Difference objects may be relative to one of the two or more baseline objects. In some embodiments, difference objects are relative to, or associated with, a baseline object preceding or following the difference object in the compressed analytics data stream. Further discussion is provided below with regard to FIG. 6.

Similar to determining the location of a baseline object in the compressed analytics data stream, determining the location of a difference object in the compressed data stream may be determined relative to the baseline object corresponding to the particular time period. In some embodiments, the location of the difference object may also be relative to one or more other difference objects associated with the baseline object corresponding to the particular time period. FIG. 6, discussed below, provides further illustration of the location of objects within the compressed analytics data stream.

An analytics service may determine if each analytic data value has been added to the compressed analytics data stream 450. If not, then the analytics service may repeat steps 420, 422, 430, 440 and 450 as indicated. In at least some embodiments, the analytics service may store the compressed analytics data stream 460 in storage, such as analytics data storage 212 discussed above with regard to FIG. 2.

In various embodiments, the compressed analytics data stream may include multiple baseline objects and multiple difference objects interleaved according to a time-based ordering of the plurality of different recurring time periods identified as for the analytic data values. For example, a compressed analytics data stream may contain analytics data for site visitors corresponding to months of a year. Thus, the object (baseline or difference) corresponding to January 2010 may be first, then February 2010, March 2010, and so on until reaching January 2011, then February 2011, and so on until reach January 2012. The time period January, for instance, is interleaved with the other different recurring time periods February through December according to a time-based ordering (for example, January comes before February). FIG. 6, discussed below provides further examples. Also included in the compressed analytics data stream may be a time period object indicating the number of distinct recurring time periods interleaved. Using the previous example, the time period object would indicate 12 distinct time periods.

In some embodiments, the compressed analytics data stream is ordered in chronological ordering. For example, the first object in the compressed analytics data stream (baseline or difference) is the oldest analytic data value in time. Conversely, in some embodiments, the compressed analytics data stream is ordered in reverse chronological ordering. Thus, for example, the first object in the compressed analytics data stream (baseline or difference) is the latest (most recent) analytic data value in time. In at least some embodiments, the compressed analytics data stream may be limited to a fixed number of analytic data values, such that when the compressed analytics data stream exceeds the fixed number, the excessive analytic data values may be removed. Dependent on the chronological ordering of the compressed analytics data stream, the oldest or latest analytic data values may be easily removed.

The compressed analytics data stream may be stored using data structures. In some embodiments, the compressed analytics data stream may be store as an array of bytes. Numerous other data structures conducive to storing baseline objects and difference objects interleaved according to a time-based ordering of multiple different recurring time periods may be envisioned, and as such, the previous example is not intended to be limiting. In some embodiments, one or more additional compression techniques may be applied to the compressed analytics data stream.

In some embodiments, an analytics service may receive a request from a remote client device, such as the analytics client described above with regard to FIGS. 1 and 2. In response to receiving the request, the analytics service may send the compressed analytics data stream to the remote client device without decompressing the compressed analytics data stream before sending the compressed analytics data stream. Alternatively, in some embodiments, an analytics service may send the compressed analytics data stream to a remote client device automatically, such as upon the indication of a particular event or condition. For example, an analytics service may send the compressed analytics data stream to a remote client upon the occurrence of a certain date or time (e.g., a monthly report date).

In at least some embodiments, an analytics service may search one or more difference objects associated with a baseline object in the compressed data stream to detect a sequence of repeating difference objects. For example, a baseline object associated with Saturday may include a baseline value of 0. Five subsequent difference objects associated with the baseline object also includes a difference value of zero, and thus the analytics service may detect the sequence of five difference objects as a repeating. In response to determining the detected sequence of repeating difference objects exceeds a compression threshold, an analytics service may modify the compressed analytics data stream to apply runtime length compression to the sequence of repeating difference objects. In some embodiments, the compression threshold may be a predetermined value optimized to apply runtime length compression when most efficient, such as when a particular time period is not likely to change in value. For example, in some embodiments, the baseline object associated with the repeating sequence of difference objects may be modified to indicate that the associated sequence of difference objects have the same value, such as by modifying the new baseline marker element to a different value (and thus the repeating difference objects may be removed from the compressed analytics data stream). Runtime length compression is well-known to those of ordinary skill in the art with many possible implementations envisioned to modify a compressed analytics data stream, and thus, the previous example is not intended to be limiting.

Figure 5:
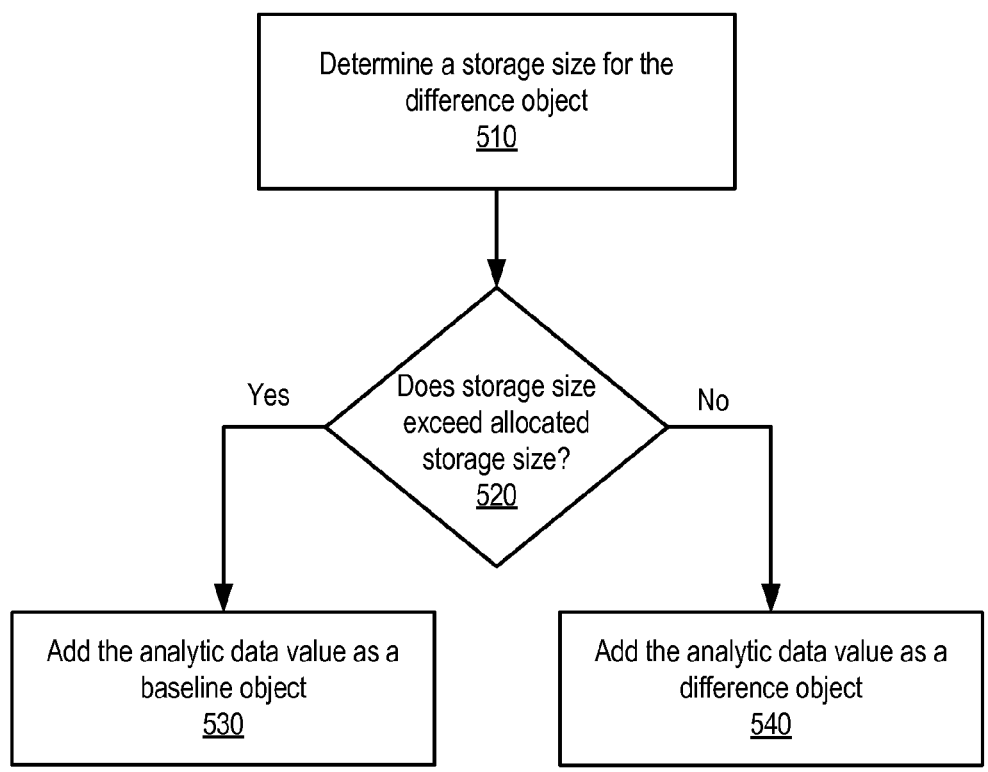
FIG. 5 illustrates a workflow of a method to determine whether to add a new baseline object to a compressed analytics data stream, according to some embodiments.
Figure 6:
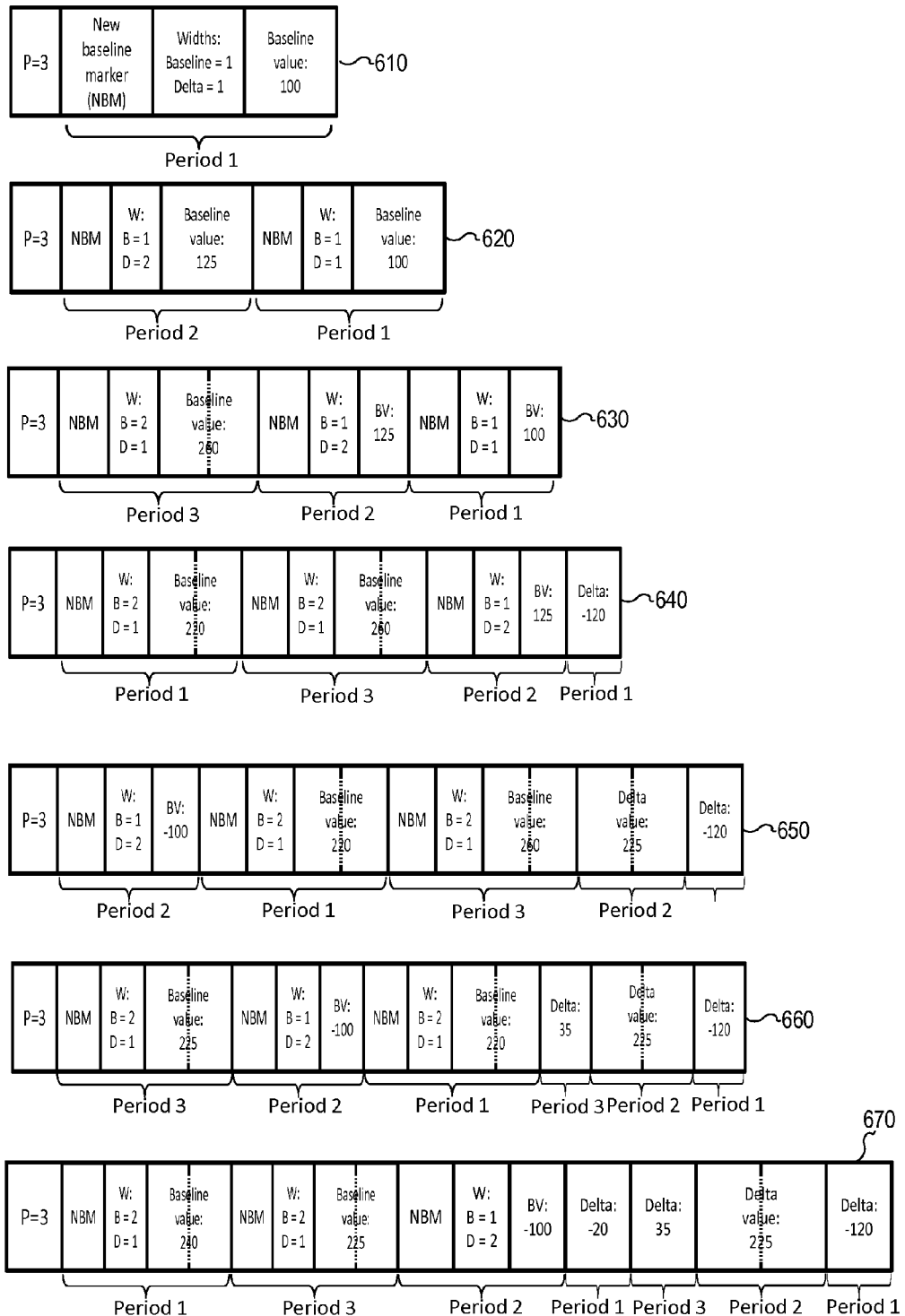
FIG. 6 illustrates an example of a compressed analytics data stream, according to some embodiments.

FIG. 6 illustrates an example of a compressed analytics data stream, generated according to the methods discussed above with regard to FIGS. 4 and 5, according to some embodiments. The compressed analytics data stream, indicated at 610, includes a time period object, P, that has a value of 3, and which indicates that the compressed analytics data stream has 3 distinct recurring time periods. If an analytics data value of 100 for period 1 is to be added, then a baseline object is inserted that includes a new baseline marker, a new baseline definition element with baseline value element storage size of 1 and a new allocated storage size for storing difference objects (represented as D for delta) of 1, and a new baseline value element storing the analytic data value of 100 stored in the one storage unit indicated for baseline value storage.

At 620, an analytic data value for time period 2, of 125 is added as a new baseline object with the same baseline object elements. Note, that the value for D is 2. Thus, two storage units, for example bytes, are allocated for storing difference objects corresponding to the second time period. As discussed above, the baseline value element storage size and the new allocated storage size for storing difference objects may, in some embodiments, be predetermined for each different time period. This value may also be changed in response to inserting another baseline value corresponding to the same time period.

As indicated at 630, a value of 260 is added for period 3. In this example, each storage unit may be represented as a signed byte, and thus a value of greater or less than ±128 may require two storage units. The elements of the baseline object corresponding to period 3 reflect a storage size of two units. At 640, another analytic data value for time period 1, 220 is to be added to the compressed analytics data stream. In the examples illustrated in FIG. 6, the compressed analytics data stream is ordered in reverse chronological order, and thus the most current information is placed at the beginning of the data stream. Thus, the value 220 is stored in the baseline object and a difference object of −120 is added to the data stream relative to the baseline object and representing the analytic data value 100 (as 220−120=100). The difference object for time period 1 is stored in the number of storage units specified in the corresponding baseline object. In this example, D=1, and thus, the delta value is stored in 1 storage unit.

At 650, another analytic data value, −100, for time period 2 is added to the compressed analytics data stream. As discussed above at 640, the most recent value is placed at the beginning of the compressed analytics data stream (to maintain reverse chronological ordering) and therefore the baseline object value is −100. The baseline object for time period 2 indicates that 2 storage units are allocated for difference objects corresponding to time period 2. Thus, the difference object stores the difference value 225 (−100+225=125) in the 2 allocated storage units. Note that if the baseline object value had a D value of 1, then an analytics server may insert a new baseline object for the analytics data value instead of a difference object, as discussed above with regard to FIG. 5. As a result, the compressed analytics data stream would have two baseline objects for time period 2, instead of a baseline object and a difference object.

At 660, an analytics data value for period 3, 225 is to be added. As discussed above, due to the reverse chronological ordering of this example, the difference object may be added with a difference value of 35 (225±35=260). The baseline value of the baseline object for time period 3 now may be 225. At 670, an analytics data for time period 1, 240 is to be added. Again, due to reverse chronological ordering, a difference object is added to the compressed analytics data stream with a difference value of −20 (240−20=220).

Figure 4:
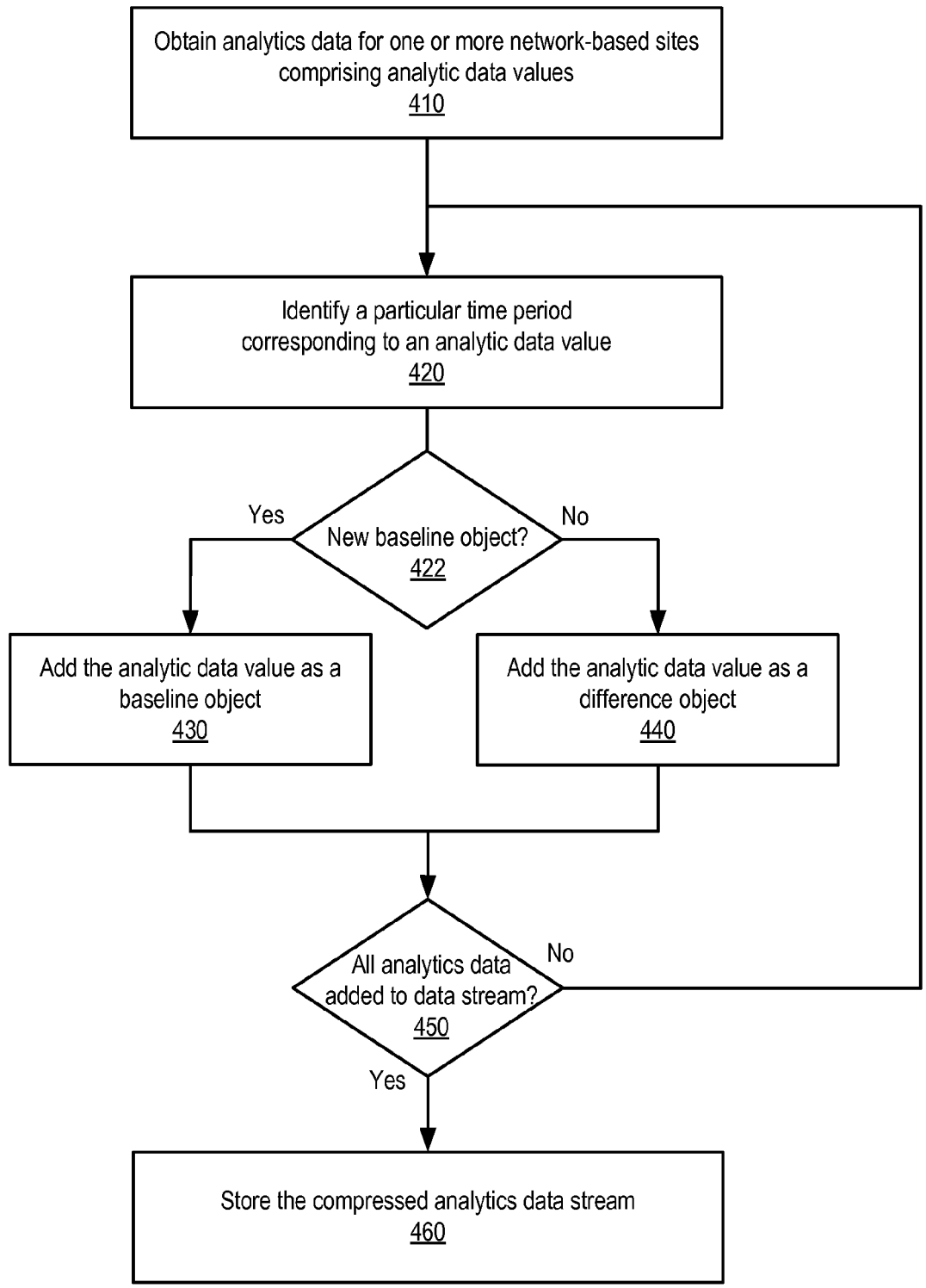
FIG. 4 illustrates a workflow of a method to compress analytics data into a compressed analytics data stream, according to some embodiments.

FIGS. 4, 5, and 6 illustrate some of many possible embodiments of compressing analytics data according to recurring time periods. Therefore, they are merely for illustrative purposes only, and not intended to be limiting as to the arrangement of steps, elements or objects, performed or ordered.

Workflow of Decompressing Compressed Analytics Data

As discussed above with regard to FIG. 3, an analytics client may obtain compressed analytics data for storage, decompression, and further processing to generate one or more views of the analytics data. FIG. 7 illustrates a workflow of a method to decompress a compressed analytics data stream, according to some embodiments. An analytics client, such as analytics client 300 may include an analytics data extractor 304 which implements the various methods described below.

An analytics client may obtain a compressed analytics data stream 710, such as described above with regard to FIGS. 4-6. Such a data stream may be obtained from an analytics service, such as described above in FIGS. 1 and 2, using one of the described communication methods, such as over wired or wireless networks. In some embodiments, the compressed analytics data stream may be stored, such as in compressed analytics data storage 302, until obtained.

An analytics client may decompress one or more portions of the compressed analytics data stream, leaving one or more portions of the compressed analytics data stream uncompressed. To decompress a portion of the compressed analytics data stream, the analytics client may identify a baseline object 720 included in the compressed analytics data stream. In various embodiments, an analytics client may search the objects included within the at least one portion of the data stream to be decompressed to locate a new baseline marker element indicating the start of a new baseline object. Such new baseline marker elements may, as discussed above, included a common value, number, or bit pattern that indicates these start of the baseline object. The analytics client may be configured to interpret one or more different types of new baseline marker elements to identify what form of compression has been applied to the baseline object.

The analytics client may then identify one or more difference objects 730 associated with the baseline object, identified at 720. In some embodiments, difference objects associated with the baseline object may be difference objects that correspond to the same time period. For example, in FIG. 6 at 670, the difference objects for time period 1 are associated with the baseline object for period 1, as they all correspond to the same baseline object. In at least some embodiments, the compressed analytics data stream may include multiple baseline objects that correspond to the same time period. The analytics client may, in those embodiments, determine the difference objects that correspond to the same time period as identified baseline object. Then, the analytics client may select one or more difference objects from among the determined difference objects that occur between the new baseline marker element of the identified baseline object and another new baseline marker element of another baseline object that corresponds to the same time period as the identified one or more difference objects. For example, looking back at 670 in FIG. 6, if the difference object −120 were instead a baseline object, and the analytics client as determining difference objects associated with the baseline object 240, the analytics client would select from among the difference objects in the same time period 1, in this case difference object −20, those difference objects that occur between the baseline object 240 and the other baseline object indicated at the location of difference object −120. In this example, there is one difference object −20 that is selected. However, if there were multiple difference objects located between the two baseline objects, then, in some embodiments the multiple difference objects would be associated with the baseline object 240. Note, that this association may be determined by selecting objects from between one baseline object to another baseline object that is located before or after the identified baseline object. An analytics client may therefore, implement identifying difference objects associated with baseline objects in multiple ways.

In at least some embodiments, the portion of compressed data to be decompressed by the analytics client may not be contiguous. For example, the analytics client may wish to only decompress analytics data associated with time period 1. Due to the objects within the compressed analytics data being interleaved according to the recurring time periods, the analytics client may identify the specified analytic data values based on the time period object, and one or more other elements included in the baseline objects to correctly determine the location of difference objects associated with portion of the analytics data. For example, the analytics client may know that the allocated storage size value for different objects corresponding to time period 2 is 3 storage units. When searching, such as by parsing through the compressed analytics data stream, the analytics client may know to read three storage units as difference object when parsing time period 2 locations.

The analytics client may then determine an analytic data value for each associated difference object relative to a baseline value element included in the baseline object 740. In some embodiments, determining the analytic data values may be determined by implementing decompression techniques according to delta compression or other similar techniques. As delta compression is well-known to those of ordinary skill in the art, a variety of methods for determining the analytic data values may be implemented. FIG. 8, discussed below, provides further examples of determining analytic data values for difference objects.

In some embodiments, the analytics client may, as indicated at 750, determine if the analytic data value for each difference object is determined. Likewise, the analytics client may also determine if there are more baseline objects 760 in the portion of the compressed analytics data stream to be decompressed. If either determination is not met, some combination of the steps indicated at 720, 730, and 740 may be repeated.

In some embodiments, the analytics client may generate views of the decompressed portion of the compressed analytics data stream for display 770 without decompressing the remaining compressed portion of the compressed analytic data stream. The analytics client may, as discussed above with regard to FIG. 3, include an analytics display generator 306 configured to generate views of the decompressed portion of the compressed analytics data stream. Such views may include a variety of graphs, tables, charts, or other visual indicators representing the decompressed analytics data.

FIG. 8 illustrates analytics data values obtained as result of performing the various methods discussed above with regard to FIG. 7. In this example, the compressed analytics data stream is indicated at 670 in FIG. 6. An analytics client may be configured to decompress compressed analytics data streams according to their chronological ordering. In this example, data stream 670 is in reverse chronological ordering. The analytics client may determine from the time period object P that every 3 objects, the recurring time periods begin again.

First parsing time period 1, the analytics client may determine that the object is a baseline object as indicated by the new baseline marker (NBM) and the baseline value to be 240, as indicated at 802. Parsing the next object, the analytics client may determine that the object is the baseline object for period 3 (due to the reverse chronological order) with a baseline value of 225, as indicated at 804. Parsing the next object, the analytics client may determine that the object is the baseline object for period 2 with a baseline value of −100, as indicated at 806. Parsing the next object, the analytics client does not find a new baseline marker element, and therefore the analytics client may recognize that the object is a difference object. The analytics client may determine the size of the difference object based on the new allocated storage size in the baseline definition element of the baseline object for period 1. Thus, the analytics client may read the value in one storage unit as the difference object for time period 1. The analytics client may, according to various techniques such as delta decompression, determine the analytic value of the difference object relative to the baseline object for time period 1. In this example, the difference object is −20, and when applied to the baseline object value, the analytic data value of 220 is returned, as indicated at 808. Similarly for the next difference object, no new baseline marker element is detected, and therefore the number of storage units read as the difference object for time period 3 is 1, returning the difference object 35. When applied to the baseline object, the returned value is 260, as indicated at 810. As with the previous objects, the next object does not include a new baseline marker indicating a baseline object, therefore the difference object is read from the next 2 storage units (according to the D value indicated as 2), returning a value of 225. When applied to the baseline object, the analytics data value is determined to be 125, as indicated at 812. Parsing the final difference object, as is common in various implementations of delta compression and similar techniques, the difference value as read, −120, is applied to the baseline object value in sequence with the other difference objects associated with the baseline object. As −120−20 ±220=100, 100 is returned as the analytics data value, as indicated at 814.

Note that FIG. 8 is provided as an illustration of one of many possible implementations of decompressing a compressed analytics data stream and, as such, is not intended to be limiting.

Example System

Embodiments of compressing analytics data according to recurring time periods for a network-based site as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device 1090 such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 2010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of compressing analytics data according to recurring time periods for a network-based site as described herein are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement embodiments of compressing analytics data according to recurring time periods for a network-based site as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the stereo drawing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
  performing, by one or more computing devices:
    obtaining analytics data for one or more network-based sites, wherein said analytics data comprises a plurality of analytic data values;
    for each analytic data value:
      identifying a particular time period corresponding to the analytic data value, wherein said particular time period is one of a plurality of different recurring time periods for the analytics data; and
      adding the analytic data value to a compressed analytics data stream as either a baseline object for the particular time period or a difference object relative to an existing baseline object for the particular time period;
    wherein said compressed analytics data stream comprises a time-based ordering of analytic data values, the ordering corresponding to a repeating sequence of the plurality of different recurring time periods, wherein the data stream comprises a plurality of baseline objects interleaved with a plurality of difference objects.

2. The method of claim 1, wherein the compressed analytics data stream is ordered in a reverse chronological ordering.

3. A method, comprising:
  performing, by one or more computing devices:
    obtaining analytics data for one or more network-based sites, wherein said analytics data comprises a plurality of analytic data values;
    for each analytic data value:
      identifying a particular time period corresponding to the analytic data value, wherein said particular time period is one of a plurality of different recurring time periods for the analytics data and
      adding the analytic data value to a compressed analytics data stream as either a baseline object for the particular time period or a difference object relative to an existing baseline object for the particular time period;
    wherein said compressed analytics data stream comprises a plurality of baseline objects and a plurality of difference objects interleaved according to a time-based ordering of the plurality of different recurring time periods identified as for the analytic data values,
    wherein said adding the analytic data value to a compressed analytics data stream comprises:
    determining a storage size for the difference object;
    determining whether the storage size exceeds an allocated storage size for storing difference objects for the particular time period; and in response to determining that the storage size exceeds the allocated storage size for storing difference objects for the particular time period, adding the analytic data value as a new baseline object for the particular time period.

4. The method of claim 3, wherein adding the analytic data value as the new baseline object for the particular time period comprises:
inserting a new baseline marker element indicating the start of a new baseline object in the compressed analytic data stream;
inserting a new baseline definition element, wherein said new baseline definition element comprises:
a new allocated storage size for storing difference objects for the particular time period;
a baseline value element storage size; and
inserting a baseline value element storing the analytic data value, wherein the baseline value element is sized according to the baseline value element storage size.

5. The method of claim 1, wherein said compressed analytics data stream further comprises a time period object indicating the number of distinct recurring time periods interleaved in the compressed analytics data stream.

6. The method of claim 1, further comprising:
receiving a request from a remote client device for the analytics data;
in response to receiving the request from the remote client device for the analytics data, sending the compressed analytics data stream to the remote client device without decompressing the compressed analytics data stream before sending the compressed analytics data stream.

7. The method of claim 1, further comprising:
searching one or more difference objects associated with a baseline object in the compressed analytic data stream to detect a sequence of repeating difference objects;
in response to determining the detected sequence of repeating difference objects exceeds a compression threshold, modify the compressed analytic data stream to apply runtime length compression to the sequence of repeating difference objects.

8. A system, comprising:
at least one processor;
and a memory comprising program instructions, wherein the program instructions when executed by the at least one processor cause the at least one processor to:
obtain analytics data for one or more network-based sites, wherein said analytics data comprises a plurality of analytic data values;
for each analytic data value:
identify a particular time period corresponding to the analytic data value, wherein said particular time period is one of a plurality of different recurring time periods for the analytics data; and
add the analytic data value to a compressed analytics data stream as either a baseline object for the particular time period or a difference object relative to an existing baseline object for the particular time period;
wherein said compressed analytics data stream comprises a time-based ordering of analytic data values, the ordering corresponding to a repeating sequence of the plurality of different recurring time periods, wherein the data stream comprises a plurality of baseline objects interleaved with a plurality of difference objects.

9. The system of claim 8, wherein the compressed analytics data stream is ordered in a reverse chronological ordering.

10. The system of claim 8, wherein to add the analytic data value to a compressed analytics data stream, the program instructions when executed by the at least one processor cause the at least one processor to:
determine a storage size for the difference object;
determine whether the storage size exceeds an allocated storage size for storing difference objects for the particular time period; and
in response to determining that the storage size exceeds the allocated storage size for storing difference objects for the particular time period, add the analytic data value as a new baseline object for the particular time period.

11. The system of claim 10, wherein to add the analytic data value as a new baseline object for the particular time period, the program instructions when executed by the at least one processor cause the at least one processor to:
insert a new baseline marker element indicating the start of a new baseline object in the compressed analytic data stream;
insert a new baseline definition element, wherein said new baseline definition element comprises:
a new allocated storage size for storing difference objects for the particular time period;
a baseline value element storage size; and
insert a baseline value element storing the analytic data value, wherein the baseline value element is sized according to the baseline value element storage size.

12. The system of claim 8, wherein said compressed analytics data stream further comprises a time period object indicating the number of distinct recurring time periods interleaved in the compressed analytics data stream.

13. The system of claim 8, wherein the program instructions when executed by the at least one processor further cause the at least one processor to:
receiving a request from a remote client device for the analytics data;
in response to receiving the request from the remote client device for the analytics data, sending the compressed analytics data stream to the remote client device without decompressing the compressed analytics data stream before sending the compressed analytics data stream.

14. The system of claim 8, wherein the program instructions when executed by the at least one processor cause the at least one processor to:
search one or more difference objects associated with a baseline object in the compressed analytic data stream to detect a sequence of repeating difference objects;
in response to determining the detected sequence of repeating difference objects exceeds a compression threshold, modify the compressed analytic data stream to apply runtime length compression to the sequence of repeating difference objects.

15. A non-transitory, computer-readable storage medium, storing program instructions that when executed by a computing device implement:
obtaining a compressed analytics data stream, wherein said compressed analytics data stream comprises a plurality of baseline objects and a plurality of difference objects, wherein each of the plurality of baseline objects and the plurality of difference objects corresponds to one of a plurality of different recurring time periods, wherein each baseline object comprises a new baseline marker element indicating the start of a new baseline object in the compressed analytic data stream; and
decompressing at least one portion of the compressed analytics data stream to obtain a plurality of analytic data values, comprising:

identifying a baseline object, wherein in said identifying a baseline object, the program instructions when executed by the computing device implement searching the at least one portion of the compressed analytics data stream to locate one of the plurality of baseline objects indicated by the new baseline marker element included within the one baseline object;

identifying one or more difference objects of the plurality of difference objects associated with the identified baseline object;

determining an analytic data value for each associated difference object relative to a baseline value element included in the baseline object; and repeatedly performing said identifying one or more difference objects and said determining an analytic value for associated difference objects for one or more other baseline objects identified in the at least one portion of the compressed analytics data stream.

16. The non-transitory, computer-readable storage medium of claim 15, wherein the compressed analytics data stream is ordered in a reverse chronological ordering.

17. The non-transitory, computer-readable storage medium of claim 15, wherein said compressed analytics data stream further comprises a time period object indicating the number of distinct recurring time periods interleaved in the compressed analytics data stream.

18. The non-transitory, computer-readable storage medium of claim 15, wherein in said identifying one or more difference objects of the plurality of difference objects associated with the identified baseline object, the program instructions when executed by the computing device implement:

determining difference objects corresponding to the one time period also corresponding to the identified baseline object; and selecting one or more difference objects from the determined difference objects that occur between the new baseline marker element of the identified baseline object and another new baseline marker element of another baseline object that corresponds to the same one time period as the identified one or more difference objects.

19. The non-transitory, computer-readable storage medium of claim 15, wherein the program instructions when further executed by the computing device implement generating one or more views of the decompressed portion of the compressed analytic data stream for display without decompressing the remaining compressed portion of the compressed analytic data stream.

20. The method of claim 1, wherein whether the analytic value is added as the baseline object or the difference object depends on a storage size for the difference object.

* * * * *